US 6,681,330 B2

(12) United States Patent
Bradford et al.

(10) Patent No.: US 6,681,330 B2
(45) Date of Patent: *Jan. 20, 2004

(54) METHOD AND SYSTEM FOR A HETEROGENEOUS COMPUTER NETWORK SYSTEM WITH UNOBTRUSIVE CROSS-PLATFORM USER ACCESS

(75) Inventors: Edward Green Bradford, Raleigh, NC (US); Daniel Edward House, Raleigh, NC (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 84 days.

This patent is subject to a terminal disclaimer.

(21) Appl. No.: 09/165,368

(22) Filed: Oct. 2, 1998

(65) Prior Publication Data

US 2002/0083336 A1 Jun. 27, 2002

(51) Int. Cl.[7] ................................................ H04L 9/00
(52) U.S. Cl. .................... 713/200; 713/201; 713/164; 713/165; 713/188; 380/241
(58) Field of Search ................................. 713/201, 164, 713/165, 188, 200, 150; 709/229; 385/22–25, 29; 395/425; 340/825

(56) References Cited

U.S. PATENT DOCUMENTS

| 5,684,950 A | * | 11/1997 | Dare et al. ............. 395/187.01 |
| 5,699,513 A | * | 12/1997 | Feigen et al. .............. 395/187 |
| 5,768,504 A | * | 6/1998 | Kells et al. ............ 395/187.01 |
| 5,892,828 A | * | 4/1999 | Perlman ...................... 380/25 |
| 5,925,126 A | * | 7/1999 | Hsieh .......................... 713/200 |
| 5,944,824 A | * | 8/1999 | He ............................... 713/201 |
| 6,073,242 A | * | 6/2000 | Hardy et al. ................ 713/201 |
| 6,131,120 A | * | 10/2000 | Reid ........................... 709/225 |
| 6,240,512 B1 | * | 5/2001 | Fang et al. ................. 713/150 |
| 6,243,816 B1 | * | 6/2001 | Fang et al. ................. 713/202 |
| 6,275,941 B1 | * | 8/2001 | Saito et al. ................. 713/201 |

OTHER PUBLICATIONS

Microsoft Press; Microsoft Corporation, Microsoft Press Computer Dictionary. 1997, 3rd Edition, p. 220.*

Gubbins, Barry : Protecting Availability in Complex Computer Environments. Candle Corporation; Information Management & Computer Security, vol. 3. 1995. Australia pp. 20–22.*

Greisdoff, Robin : Raxco introduces new cross–platform client/server security division—AXENT(™) technologies. Raxco Inc.; Business Wire, section 1. Aug. 1994 New York. p. 1–3.*

(List continued on next page.)

Primary Examiner—Ayaz Sheikh
Assistant Examiner—Leynna Ha
(74) Attorney, Agent, or Firm—Sawyer Law Group LLP

(57) ABSTRACT

Aspects for a heterogeneous computer network system with unobtrusive cross-platform user access are described. In an exemplary system aspect, the system includes a plurality of computer systems coupled in a network, each of the plurality of computer systems operating according to one of a plurality of operating system platforms, each operating system platform having an associated security mechanism. The system further includes an enterprise directory included on at least one server system of the plurality of computer systems, the enterprise directory configured for security interception to allow an authorized user access among the services of the plurality of computer systems without affecting the associated security mechanisms of the plurality of operating system platforms.

16 Claims, 3 Drawing Sheets

OTHER PUBLICATIONS

Adhikari, Richard : Unresolved security issues blunt distributed hoopla. Sentry Publishing Inc.; Software Magazine, vol. 15. Feb. 1995 Barrington. p. 44.*

Messmer, Ellen : Axent software provides for single network sign–on. Network World Inc.; Network World. vol. 14. Apr. 1997 Framingham. start p. 12.*

Janah, Monua : Secure network base. CMP Publications; Informationweek. Issue 643. Aug. 1997 Manhasset. pp. 107–109.*

Chen, Anne : Directories on trial: Managers win support for directory infrastructure investments by emphasing ROI, security benefits. ziff–Davis Publishing Company; PC Week. Oct. 1999. pp. 1–4.*

Vacc, John R.: Single Sign–On for the Enterprise; Pomeroy, Ohio. 2002 CRC Press LLC, 17 pages.*

Biggs, Maggie: IBM's simple, secure Sign–on; Framingham. Aug. 11, 1997 InfoWorld Publications, Inc., vol. 19, Issue 32 pp. 1,101–1,103.*

* cited by examiner

METHOD AND SYSTEM FOR A HETEROGENEOUS COMPUTER NETWORK SYSTEM WITH UNOBTRUSIVE CROSS-PLATFORM USER ACCESS

FIELD OF THE INVENTION

The present invention relates to multiplatform computer system networks, and more particularly to providing distributed security for unobtrusive access across multiplatform networks.

BACKGROUND OF THE INVENTION

In distributed computer networks, many operating system platforms may be employed on server and client systems within the network. Each different platform utilizes its own administrative rules for user login procedures. Thus, each platform typically has characteristic techniques for assigning user identifiers and passwords to control access to the resources and services of the system. In large, heterogeneous network environments, difficulty exists in providing user access to resources on a platform that is different than the one the user is logged-in to. Thus, the user is restricted from effectively and efficiently utilizing the resources of the network.

In an attempt to overcome such problems, Microsoft's™ Active Directory aspect of the NT-5 platform solves a technical problem that other directories in the past have not solved: distributed security. Other directories are aimed at making certain kinds of data more available. Active Directory is aimed at making distributed computing more available. Active Directory is Microsoft's enabling mechanism for distributed security, Zero Administration Workstation (ZAW), and product suite integration. Through Active Directory, products see a common schema, common definitions for User and user and are able to exploit data of several different "qualities": volatile, transactional, and "classic"(where classic means low write to read ratio, relatively unchanging, and low ACID (atomicity, consistency, isolation, and durability) property requirements). Unfortunately, such a scheme for distributed security is extremely limited, since it is only operable on NT platform systems and services leaving other platforms and services still unable to provide effective and efficient utilization of resources across platforms.

Another technique, commonly known as global sign-on, provides a global security feature that alters local security administration. Thus, while providing cross-platform access, global sign-on increases administrative overhead by intruding upon local procedures and demanding conformance to the global security requirements.

Accordingly, a need exists for a mechanism to give the heterogeneous network enterprise a common user identity and to integrate the user's (and server's) experience among different platforms, without being intrusive. The present invention addresses such a need.

SUMMARY OF THE INVENTION

The present invention provides aspects for a heterogeneous computer network system with unobtrusive cross-platform user access. In an exemplary system aspect, the system includes a plurality of computer systems coupled in a network, each of the plurality of computer systems operating according to one of a plurality of operating system platforms, each operating system platform having an associated security mechanism. The system further includes an enterprise directory included on at least one system of the plurality of computer systems, the enterprise directory configured for security interception to allow an authorized user access among the services of the plurality of computer systems without affecting the associated security mechanisms of the plurality of operating system platforms.

Through the present invention, local security procedures and policies apply on each platform, thus allowing users to log-on to a single network operating system according to that system's known log-in procedures. A user object is achieved that, when spanning all systems, provides a distributed user context that is useful in unobtrusively achieving access to separate platforms. These and other advantages of the aspects of the present invention will be more fully understood in conjunction with the following detailed description and accompanying drawings.

DETAILED DESCRIPTION OF THE INVENTION

The present invention relates to a method and system for unobtrusively achieving secure cross-platform access in a heterogeneous network environment. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
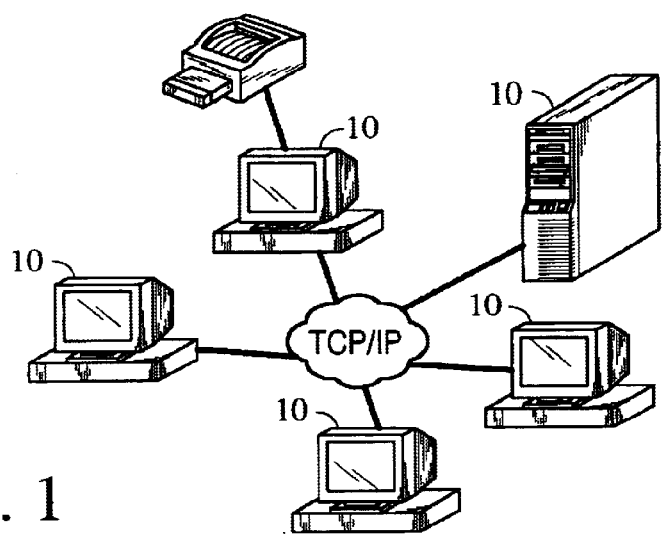
FIG. 1 illustrates a network system diagram in accordance with the present invention utilizing an appropriate network communication protocol, such as TCP/IP.

FIG. 1 illustrates a diagram representation of a heterogeneous, distributed computer network arrangement that includes a plurality of computer systems 10, e.g., a plurality of server and client systems, that communicate in accordance with an appropriate communication protocol, e.g., TCP/IP. The systems 10 operate under different types of operating system platforms, such as computer systems operating under AIX, OS/390, OS/2, OS/400, VM, MVS, or NT, as is well understood by those skilled in the art. Of course, the platforms listed herein are meant as illustrative examples of suitable platforms. Other platforms may be utilized as desired for particular design needs, as is well understood by those skilled in the art.

In accordance with the present invention, each platform includes functionality to support a distributed user context that is useful and used by all important products on each platform via user objects, referred to herein as EnterpriseUsers, that span all platforms and exist in a directory referred to herein as eDirectory (enterprise directory). The structure for supporting the EnterpriseUsers includes providing the eDirectory as a non-optional part of software product suites in use on the computer systems, with the eDirectory being the distributed security repository for all multiplatform products, and having a common schema, standard LDAP interfaces with full support for vital data ACID properties, where LDAP stands for lightweight directory access protocol, an Internet standard for directories. Every platform further includes an eDirectory security adapter, eDSA, that intercepts security account information on each platform and populates it into the eDirectory, including removing an association for an EnterpriseUser when the user identification and password become invalid on a platform. The EnterpriseUser comprises a security context 'above' the local security context of a system.

Figure 2:
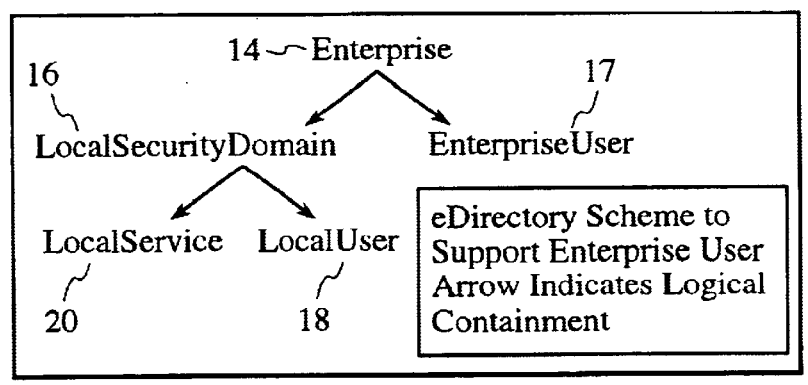
FIG. 2 illustrates a logical containment relationship diagram in accordance with the present invention.

By way of example, a logical containment relationship among some key objects supporting the EnterpriseUser object is shown in FIG. 2. Each enterprise 14 is defined as a container of LocalSecurityDomain(s) 16 and EnterpriseUser(s) 17. More than one enterprise 14 may be defined, if desired, to better partition sets of users and tasks to manage security. Every LocalSecurityDomain 16 comprises LocalUsers 18 and LocalServices 20. A LocalUser 18 is defined for every userid defined on that local system. A LocalService 20 is defined for every user of the eDirectory security services. A LocalService 20 might be TXSeries, for example. In a preferred embodiment, any provider of a service that requires cross platform security needs to be defined as a LocalService 20. The eDSA for a particular LocalSecurityDomain 16 suitably exists as a LocalService 20 under that domain with permission to add and delete LocalUser 18 objects with the authority to do so granted to only the eDSA and an "administrator" of the LocalSecurityDomain 16.

Implicit in the concept of EnterpriseUser's heterogeneity is that local system security is insufficient in an enterprise. Local system security therefore is used for local objects, but a 'higher authority' is required across systems. The 'higher authority' suitably comprises an appropriate security mechanism, such as the DCE (distributed computing environment) Security Registry and DCE userids. However, DCE's security mechanisms are preferably buried and hidden inside the eDirectory. The embedding of the DCE security into the eDirectory occurs as described hereinbelow with reference to an example scenario.

For purposes of illustration, the aspects of the present invention are described with reference to a particular scenario, as follows. A company, Ronco Incorporated, has a heterogeneous computing environment. Currently, their network includes 1 NT domain and 1 MVS domain (i.e., one MVS system image). They want the benefits of products that work across the machine boundaries of the heterogeneous enterprise. In the example, a service, TXSeries, running on NT will be able to run batch jobs on MVS transparently to the NT users on whose behalf the work is being done (e.g., such as printing off large jobs on massive laser printers.) Further, there are two very separate groups of users, sales and marketing, that the corporation has chosen to keep separate in every way. Thus, enterprise entities are established to maintain the group separation, with separate administration.

Figure 3:
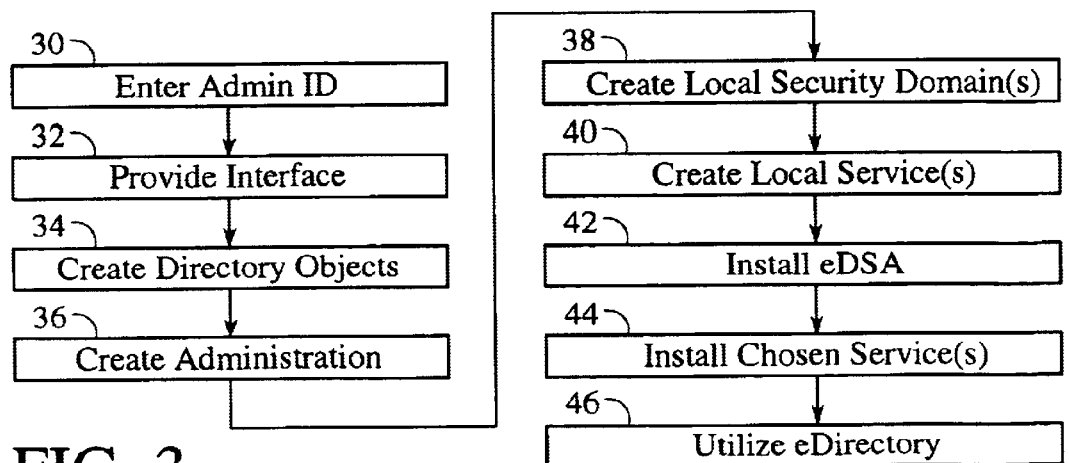
FIG. 3 illustrates a block flow diagram of a process for installing and configuring an enterprise directory in accordance with the present invention.

A process for installing and configuring an eDirectory on a server system, e.g., the NT system and MVS system of Ronco, is described with reference to the flow diagram of FIG. 3. The eDirectory preferably is installed with each LocalSecurityDomain installed. These directories are preferably setup to be replicas of each other for performance, availability, ease of administration, and common security context, as is well appreciated by those skilled in the art. To configure the eDirectory as desired, preferably a series of steps are implemented, e.g., by an administrator, via an input mechanism, e.g., a GUI. Thus, for installation of the eDirectory, the process includes providing an administrator user identifier and password (step 30), i.e., in response to a prompting for an administrative userid/pwd, e.g., ADMIN/PWD. ADMIN/PWD represents a DCE userid and password that is buried. Note that the eDirectory preferably embeds a version of the DCE security registry with every server runtime, as is well appreciated by those skilled in the art. This results in creation of the schema objects shown in FIG. 2 and setting of the ACLs (access control list) such that only ADMIN/PWD can modify them.

Figure 4:
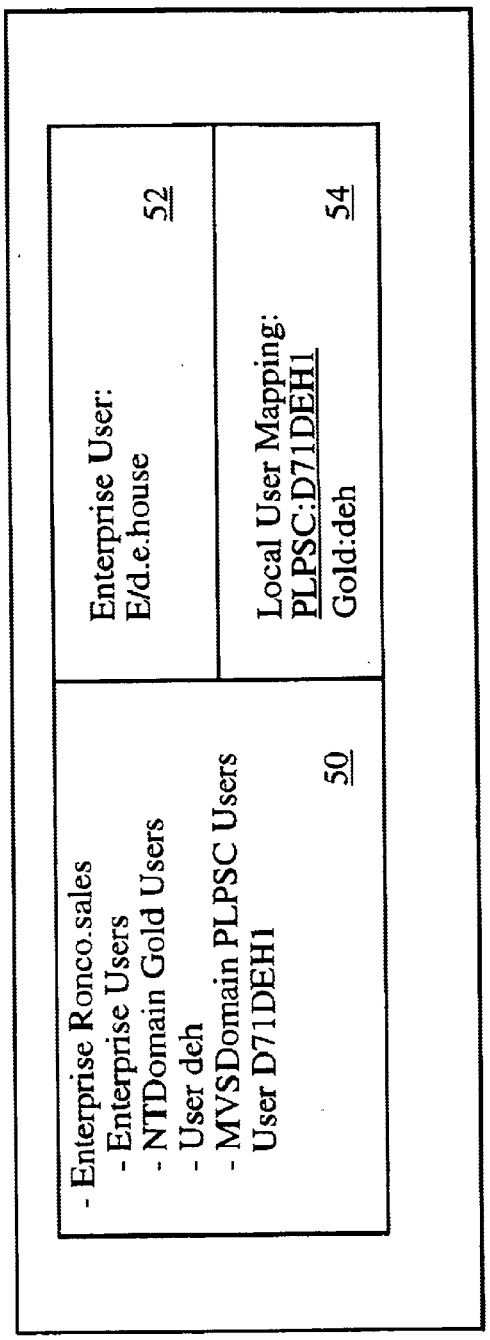
FIG. 4 illustrates an exemplary administrative GUI (graphical user interface) tool for the enterprise directory installation and configuration of the present invention.

An administration interface is then provided (step 32), i.e., the Admin GUI for the eDirectory is provided, with prompting for the userid/pwd, ADMIN/PWD. FIG. 4 illustrates an example of a suitable GUI 50. Directory objects are then created (step 34). Thus, while running the GUI 50 under ADMIN/PWD, Enterprise objects are created for the groups, e.g., the Enterprise object 58 (FIG. 5), for the group Ronco.sales. By inheritance of ACL information, only ADMIN/PWD can read or write these objects. Desired administrative control of the groups is then created, if desired (step 36). For example, while still running under ADMIN/PWD, the user creates a new administrator userid/pwd called ADMIN2/PWD2, i.e., a new DCE userid/pwd, which is suitably added to the ACL for Ronco.marketing. That userid/pwd now has authority to administer the enterprise called Ronco.marketing, and ADMIN/PWD has authority to administer Ronco.sales (and Ronco.marketing unless that permission is removed).

Figure 5:
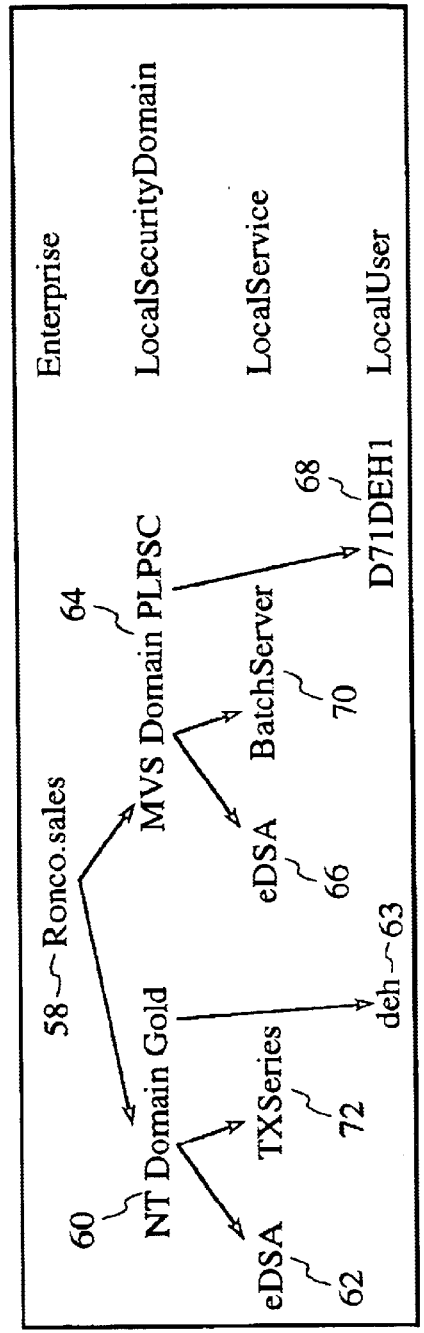
FIG. 5 illustrates a logical containment relationship diagram corresponding to an scenario described with reference to FIG. 3.

In conjunction with the following steps, refer to FIG. 5, which illustrates resultant logical containment relationship among some key objects for the enterprise directory object 'Ronco.sales' 58. To achieve the relationship shown by FIG. 5, desired local security domain(s) are created (step 38). For example, a new LocalSecurityDomain 60 under Ronco.sales called"NT Domain Gold" is created and provided with userid/pwd=GoldSystem/123whatrwefightin4, i.e., a new DCE userid, while still under ADMIN/PWD. Suitably, a LocalService eDSA 62 is automatically created under the LocalSecurityDomain 60 with ACLs set such that the eDSA 62, as identified by the DCE userid/pwd, can add and delete LocalUser objects 63 under this LocalSecurityDomain 60 (by inheritance, so can ADMIN/PWD, but no one else). Further, preferably, while still under ADMIN/PWD, another new LocalSecurityDomain 64 called"MVS Domain PLPSC" is created under Ronco.sales and provided with userid/pwd=PLPSCSystem/yell4beforelaunching, its new DCE userid. Again, a LocalService eDSA 66 is automatically created under the LocalSecurityDomain 64 with ACLs set such that the eDSA 66, as identified by the DCE userid/pwd, can add and delete LocalUser objects 68 under this LocalSecurityDomain 64 (by inheritance, so can ADMIN/PWD, but no one else).

Creation of additional desired local service(s) follows (step 40). In accordance with the example scenario, a LocalService 70 under LocalSecurityDomain 64 "MVS Domain PLPSC" called BatchServer is created and provided with userid/pwd=Batch 123/1 isthelonliestnumber, a new DCE userid. While further still under ADMIN/PWD, a LocalService 72 under LocalSecurityDomain 60 "NT Domain Gold" called TXSeries is created and provided with userid/pwd=TXSeries 123/2canbeasbadas1, a new DCE userid. It should be noted that the preceding describes a manual procedure, such as by an administrator utilizing a keyboard. However, LocalService objects could be added by the services themselves when they are installed, thus reducing the manual steps involved. Of course, some assistance by the eDSA would be necessary.

The set-up for the enterprise is thus completed, allowing configuration on the different domains. The eDSA(s) are then installed on the systems, as desired (step 42). In the example, eDSA 62 is installed on LocalSecurityDomain 60 "NT Domain Gold", which results in prompting for userid/pwd, GoldSystem/123whatrwefightin4. This eDSA 62 is now able to authenticate itself to the eDirectory (using DCE userid GoldSystem) whenever it needs to. When eDSA 62 then starts, such as configured as an NT Service, it populates the eDirectory with LocalUser objects 63 under LocalSecurityDomain 60 "NT Domain Gold". Similarly, eDSA 66 is installed on LocalSecurityDomain 64 "MVS Domain PLPSC". When prompted for userid/pwd, PLPSCSystem/yell4beforelaunching is provided. This eDSA 66 is now able to authenticate itself to the eDirectory (using DCE userid PLPSCSystem) whenever it needs to. When this eDSA 66 starts, it populates the eDirectory with LocalUser objects 68 under LocalSecurityDomain 64 "MVS Domain PLPSC",. That is, one function of the eDSAs is to look at local security account information and replicate selected parts of that information (i.e., the users) into the eDirectory.

The desired service(s) created by step 40 are then installed (step 44). For example, TXSeries 72 on NT Domain Gold is installed. Its enterprise userid/pwd, TXSeries123/2canbeasbadas1 is provided upon prompting, which enables TXSeries 72 to authenticate itself using this DCE userid when needed. Similarly, BatchServer 70 is installed on MVS Domain PLPSC with Batch123/1isthelonliestnumber provided when prompted for its enterprise userid/pwd, which enables Batch123 to authenticate itself using this DCE userid when needed.

Once the configuration is completed, utilization occurs as desired (step 46). For example, the Admin GUI for eDirectory is displayed (e.g., the GUI 50 of FIG. 4) and utilized by supplying userid/pwd, ADMIN/PWD. A new EnterpriseUser object called E/Ronco.sales/d.e.house can then be created and associated with LocalUser objects: NT Domain Gold/deh and MVS Domain PLPSC D71DEH1. The LocalUser objects, D71DEH1 and deh, are created by the administrators of the MVS and NT systems, respectively, in accordance with the local security context user creation techniques for those systems, as is well appreciated by those skilled in the art.

To create the new EnterpriseuserObject E/Ronco.sales/d.e.house, for example, suitably the administrator expands the "Enterprise Users" tab in the GUI and selects the EnterpriseUser object called E/d.e.house and then contracts the Enterprise Users view. The selected EnterpriseUser object is capably shown in the upper right pane view 52. All of the local security domain objects (userids) that are part of EnterpriseUser E/d.e.house are shown in the lower right pane view 54. By way of example, new local userids can be added to E/d.e.house by dragging them from the tree view shown in the left. They can be deleted by highlighting the entry and hitting <del>. Likewise, the entire EnterpriseUser called E/d.e.house can be deleted, as can whole security domains within the tree view for the enterprise called Ronco.sales. Thus, the eDirectory installation and configuration does not affect local security administration, but links locally created users to EnterpriseUser objects to ease cross-platform system utilization unobtrusively to local security constructs, as demonstrated further hereinbelow.

Figure 6:
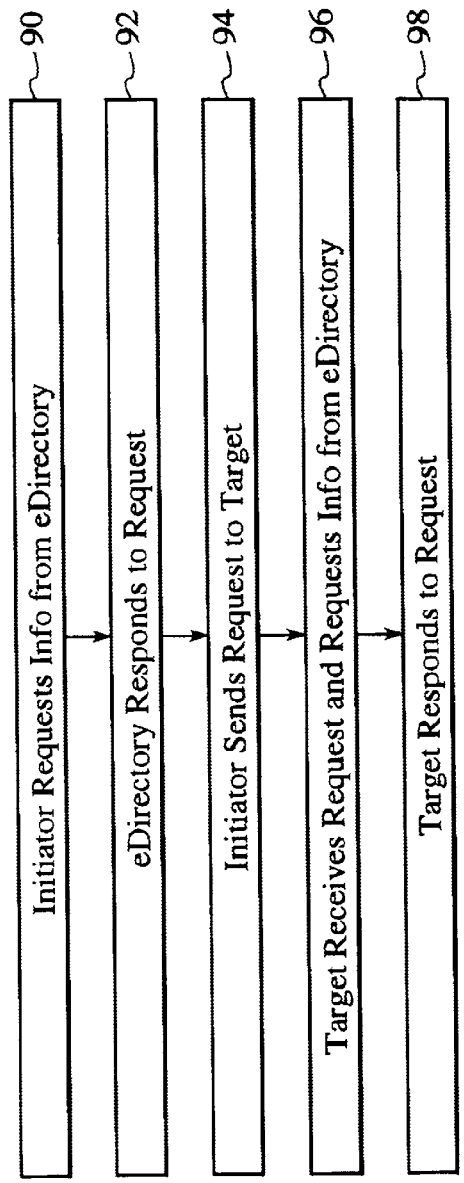
FIG. 6 illustrates a block flow diagram of utilization of an enterprise directory for cross-platform access in accordance with the present invention.
Figure 7:
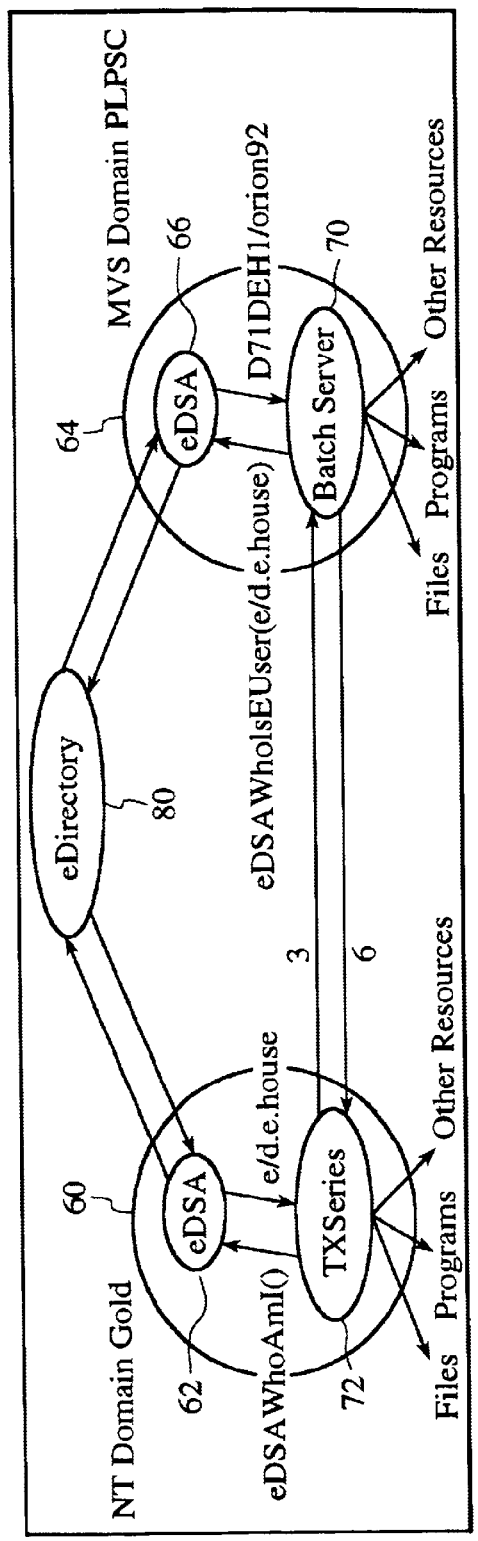
FIG. 7 illustrates schematically the utilization described with reference to FIG. 6.

Utilization of the installed and configured eDirectory to achieve unobtrusive cross-platform access is described with reference to the flow diagram of FIG. 6 and in conjunction with a security information diagram for an example scenario in FIG. 7. It should be appreciated that although the preferred back-end directory is described herein as the eDirectory, any directory is an alternative as long as that directory can be changed to add the required security services described herein.

The process begins with an initiator requesting information from the eDirectory (step 90). By way of example, the initiator is represented by the service TXSeries 72, which knows that it wants access to some other enterprise service, e.g., BatchServer 70. The TXSeries 72 capably locates the other service though the use of location information in the eDirectory (e.g., as a basic LDAP supplier). Thus, TXSeries 72 makes a request, while running under the local NT security context of a logged-on user (NTGold/deh), to the eDSA 62 and requests the EnterpriseUser that maps to the logged-on NT user (e.g., via an API "eDSAWhoAmI( )"). The eDSA 62 authenticates that the requestor is allowed to make this request, by checking for At "root" or "NT Service" authority, for example, or by using authenticated, private RPC (remote procedure call). Alternatively, the eDSA 62 is configured to allow anyone to make a mapping request, although no password information would be provided without authentication and privacy. The eDSA 62 preferably uses two-way authenticated private communication (e.g., authenticated RPC with packet level privacy) to an eDirectory server 80 to retrieve the EnterpriseUser ID associated with NTGold/deh. Since the communication from eDirectory 80 to eDSA 62 was authenticated, eDirectory 80 knows exactly which LocalSecurityDomain object this mapping must be under, and the eDirectory 58 only returns information under the correct LocalSecurityDomain directory object.

The process then continues with the eDirectory 80 providing the appropriate information in response (step 92). Accordingly, the eDirectory 80 returns the EnterpriseUser ID e/d.e.house to the eDSA 62, which in turn, returns the ID to the calling service, TXSeries 72. Note, no password information was returned, and TXSeries 72 does not use EnterpriseUser e/d.e.house as a local security context. Rather, TXSeries 72 uses either its internal security means, or it uses NTGold/deh (the logged in user) and impersonation to access local objects, such as files, programs, and other local resources. Thus, the local security is always local: objects such as files on NT already have ACLs and those are unchanged. NT security is still NT security and MVS security is still MVS security. EnterpriseUser does not replace local system security, it augments local system security.

The initiator then makes a request of a target system (step 94). Accordingly, TXSeries 72 makes a request to BatchServer 70 using whatever means BatchServer 70 chooses to export services to clients (e.g., SNA, TCP/IP, etc.). TXSeries 72 passes the EnterpriseUser ID e/d.e.house with the request, but not a password. Because no password flows, the communication between TXSeries 72 and BatchServer 70 may or may not be secure: that depends on BatchServer interfaces, as is well appreciated by those skilled in the art. Thus, EnterpriseUser does not force changes in existing interfaces, except to pass an EnterpriseUser ID, so that insecure interfaces do not have to be made secure.

The target system receives the request and requests information from the eDirectory via eDSA (step 96). In the example, BatchServer 70 receives the request for some processing or information from the TXSeries 72 client. In one embodiment, for security, BatchServer 70 optionally decides to impersonate the requestor to support the EnterpriseUser security context. To do so, BatchServer 70 needs to know the userid and password under which to run the request. BatchServer thus makes a request to the eDSA 66 to map e/d.e.house to a local userid and password. The eDSA 66 in this case (on MVS) authenticates that BatchServer 70 is allowed to make this request by verifying that BatchServer 70 is APF (authorized program facility) authorized (for a specific MVS example, or by using authenticated RPC on any platform), e.g., via an API "eDSAWhoIsEUser(e/d.e.house)". The eDSA 66, using the secure channel to eDirectory 80 requests the mapping from e/d.e.house to the local MVS userid and password that corresponds to this EnterpriseUser.

eDirectory 80 returns the MVS userid D71DEH1 and password orion92 over the two-way authenticated and private RPC channel. With the eDSA 66 then returning D71DEH1/orion92 to BatchServer 70, BatchServer 70 can now use the information to impersonate a real user and utilize local MVS system security. BatchServer 70 can therefore access local MVS system resources, such as files, programs, and other resources using the valid MVS userid D71DEH1/orion92, or BatchServer 70 can access resources under its own security context and just know that there is a valid MVS userid. Local MVS/BatchServer security is therefore unaffected by the EnterpriseUser security services after the mapping from e/d.e.house to a local MVS user was made.

The target system proceeds with the sending of a response to the initiator (step 98). For the example, BatchServer 70 therefore returns whatever information TXSeries 72 requested. Since this communication has nothing to do with the EnterpriseUser object, whether or not this is a secure channel is entirely up to BatchServer and the way BatchServer exposes its interfaces.

The preceding has been described in a passive approach where the services involved have an insecure communication channel between them. Thus, in the passive method, a requesting service on one machine obtains an EnterpriseUserID and passes it to the target service without password information. The target service must retrieve password information from the eDirectory in order to impersonate the client (i.e., to have a local userid/password combination).

In an alternate embodiment, an active method is used. The active method is very similar to the passive method, except that both EnterpriseUserID and password flow between the requesting service and the target service. Obviously, this approach would not be used in situations where an insecure channel existed between the requesting service and the target service.

It should be appreciated that the eDSA 62 or 66 could be made smart enough to cache EnterpriseUser mapping information. Cache coherency is a potential problem, so triggers on EnterpriseUser data in the eDirectory would need to be able to invalidate eDSA caches, as is well appreciated by those skilled in the art. While a somewhat difficult problem to solve, the reduction in traffic to the eDirectory may make the performance benefit significant (such as on large systems including MVS). Thus, the decision to make the eDSA smart enough to cache can be made platform by platform with the eDirectory then having to support triggers, or events.

Further, the EnterpriseUser support for exploiting services is demonstrated with the use of only two new APIs, e.g., eDSAWhoAmI(null) and eDSAWhoIsEUser(euser). Of course, there might be more APIs to expose to other services, but these two represent a minimal set.

In addition, in an alternate embodiment, the services could choose to use e/d.e.house as a security context under which to run. This choice would allow a requesting service, e.g., TXSeries 72, to run requests using EnterpriseUser as a replacement for local system security. In this case, the existence of the local id (Gold/deh) to EnterpriseUser ID (e/d.e.house) would be considered "logging in" to e/d.e.house. This would force the flows between eDSA 62 and TXSeries 72 to be secure. This potentially provides a way to replace (long term) the myriad of security mechanisms many products use internally and can't adequately share between services.

Although the present invention has been described in accordance with the embodiments shown, one of ordinary skill in the art will readily recognize that there could be variations to the embodiments and those variations would be within the spirit and scope of the present invention. Particularly, DCE was used to achieve authentication services and secure communication with RPC privacy. Instead of DCE, another authentication and secure communication mechanism could be used and integrated with the eDirectory. Accordingly, many modifications may be made by one of ordinary skill in the art without departing from the spirit and scope of the appended claims.

What is claimed is:

1. A method for achieving secure user access to multiple system platforms in a distributed computer network without altering platform security mechanisms, the method comprising:

administering at least one first computer system operating under a first operating system platform through a first security mechanism;

administering at least one second computer system operating under a second operating system platform through a second security mechanism; and configuring an enterprise directory on at least one system in the distributed computer network to provide an intercept security mechanism that allows an authorized user access among services in the at least one first computer system and the at least one second computer system without altering the first and second security mechanisms.

2. The method of claim 1 wherein configuring further comprises establishing an enterprise user identity for the authorized user in the enterprise directory.

3. The method of claim 2 further comprising associating the enterprise user identity with a user identification and password from the first security mechanism and from the second security mechanism in the enterprise directory.

4. The method of claim 3 further comprising automatically removing an association for the enterprise user identity when the user identification and password become invalid in one of the at least one first computer system or at least one second computer system.

5. The method of claim 1 wherein the at least one system comprises the at least one first computer system and the at least one second computer system.

6. The method of claim 1 wherein configuring further comprises utilizing distributed computing environment registry security mechanisms embedded within the enterprise directory.

7. A heterogeneous computer network system with unobtrusive cross-platform user access comprising:
   a plurality of computer systems coupled in a network, each of the plurality of computer systems operating according to one of a plurality of operating system platforms, each operating system platform having an associated security mechanism; and
   an enterprise directory included on at least one server system of the plurality of computer systems, the enterprise directory configured for security interception to allow an authorized user access among the services of the plurality of computer systems without affecting the associated security mechanisms of the plurality of operating system platforms.

8. The system of claim 7 wherein the enterprise directory further comprises at least one enterprise of one or more local security domains and one or more enterprise users.

9. The system of claim 8 wherein the one or more local security domains further comprise local services and local users.

10. The system of claim 9 wherein the enterprise users provide associations for local users with the enterprise directory.

11. The system of claim 10 wherein an administrative graphical user interface provides a tool for forming the associations for local users.

12. The system of claim 7 wherein the enterprise directory utilizes embedded distributed computing environment registry security mechanisms.

13. A method for achieving secure user access to multiple system platforms in a distributed computer network without altering platform security mechanisms, the method comprising:
   configuring an enterprise directory by:
      establishing at least one enterprise;
      establishing a local security domain for each platform domain of the at least one enterprise;
      providing an enterprise directory security adapter (eDSA) as one of a plurality of local services for each of the local security domains;
      establishing one or more other local services for each local security domain; and
      establishing one or more local users for each local security domain; and
   utilizing the enterprise directory to allow an authorized user access among the local services without altering security mechanisms of the local security domains.

14. The method of claim 13 wherein utilizing further comprises utilizing the eDSA of each local security domain to facilitate security interception and translation of a first local user of a service on a first local security domain into an enterpriser user when an authorized attempt is made by the user to access a service on a second local service domain.

15. The method of claim 14 further comprising utilizing the enterprise user during communication between the first and second local security domains.

16. A method for achieving secure user access to multiple system platforms in a distributed computer network without altering platform security mechanisms, the method comprising:
   configuring an enterprise directory by:
      establishing at least one enterprise;
      establishing a local security domain for each platform domain of the at least one enterprise;
      providing an enterprise directory security adapter (eDSA) as one of a plurality of local services for each of the local security domains;
      establishing one or more other local services for each local security domain;
      establishing one or more local users for each local security domain; and
   utilizing the enterprise directory to allow an authorized user access among the local services without altering security mechanisms of the local security domains, including utilizing the eDSA of each local security domain to facilitate security interception and translation of a first local user of a service on a first local security domain into an enterpriser user when an authorized attempt is made by the user to access a service on a second local service domain, and utilizing the enterprise user to determine an identifier and password for the first local user on the second local service domain, and using the identifier and password in a secure manner for communication between the first local service domain and the second local service domain.

* * * * *